US012762989B2

(12) United States Patent
Lee

(10) Patent No.: US 12,762,989 B2
(45) Date of Patent: Oct. 13, 2026

(54) DISPLAY DEVICE

(71) Applicant: LG Display Co., Ltd., Seoul (KR)

(72) Inventor: Junhee Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/193,134

(22) Filed: Apr. 29, 2025

(65) Prior Publication Data

US 2026/0162588 A1 Jun. 11, 2026

(30) Foreign Application Priority Data

Dec. 6, 2024 (KR) ........................ 10-2024-0180597

(51) Int. Cl.
*G09G 3/20* (2006.01)

(52) U.S. Cl.
CPC ..... *G09G 3/2092* (2013.01); *G09G 2310/027* (2013.01); *G09G 2310/0275* (2013.01); *G09G 2310/0291* (2013.01); *G09G 2310/08* (2013.01); *G09G 2320/0285* (2013.01); *G09G 2330/021* (2013.01)

(58) Field of Classification Search
CPC ........... G09G 3/2092; G09G 2310/027; G09G 2310/0275; G09G 2310/0291; G09G 2310/08; G09G 2320/0285; G09G 2330/021
See application file for complete search history.

(56) References Cited

U.S. PATENT DOCUMENTS 6,417,829 B1 * 7/2002 Jung .................... G09G 3/3688 345/98
11,514,848 B2 * 11/2022 Kim .......................... G09G 3/32
11,837,167 B2 * 12/2023 Kim ...................... G09G 3/3233
12,164,361 B2 * 12/2024 Lim ....................... G06F 1/3265
2002/0044142 A1 * 4/2002 Fukuda ................ G09G 3/3696 345/204
2008/0192038 A1 * 8/2008 Liu .......................... G09G 3/20 345/206
2010/0007680 A1 * 1/2010 Yu ............................ G09G 5/10 327/530
2012/0133635 A1 * 5/2012 Ji ......................... G09G 3/3688 345/212
(Continued)

FOREIGN PATENT DOCUMENTS

KR 10-2022-0096871 A 7/2022

*Primary Examiner* — Benyam Ketema
(74) *Attorney, Agent, or Firm* — Fenwick & West LLP

(57) ABSTRACT

Provided is a display device. The display device includes a timing controller configured to generate image data and a data control signal based on an input image and a control signal, a data driver configured to generate a plurality of data signals corresponding to the image data based on the image data and output the data signals through a plurality of output buffers respectively corresponding to a plurality of channels and a display panel comprising data lines connected to the plurality of output buffers, and a plurality of pixels connected to the data lines, wherein the timing controller compares the image data in horizontal line units of pixels for each of the plurality of channels and controls a magnitude of a drive current of the plurality of output buffers based on the amount of change in the image data compared in the horizontal line unit for each of the channels.

19 Claims, 7 Drawing Sheets

(56) References Cited

U.S. PATENT DOCUMENTS

| | | | | |
|---|---|---|---|---|
| 2012/0194568 | A1* | 8/2012 | Keum | G09G 3/342<br>345/102 |
| 2021/0104204 | A1* | 4/2021 | Masai | G09G 3/3677 |
| 2021/0248956 | A1* | 8/2021 | Pyo | G09G 3/3233 |
| 2022/0208089 | A1* | 6/2022 | Kim | G09G 3/32 |
| 2022/0415279 | A1* | 12/2022 | Kang | G09G 3/3688 |
| 2023/0005425 | A1* | 1/2023 | Kim | G09G 3/3233 |
| 2023/0119897 | A1* | 4/2023 | Oh | G09G 3/3275<br>345/204 |
| 2025/0046228 | A1* | 2/2025 | Kim | G09G 3/2074 |
| 2025/0336328 | A1* | 10/2025 | Kim | G09G 3/2044 |

* cited by examiner

<LUT1>

| DIFF | WT |
|---|---|
| D_RG1 | WT1 |
| D_RG2 | WT2 |
| D_RG3 | WT3 |
| D_RG4 | WT4 |
| D_RG5 | WT5 |
| D_RG6 | WT6 |
| D_RG7 | WT7 |

FIG. 5

<LUT2>

| AWT | PWRC |
|---|---|
| W_RG1 | HHH |
| W_RG2 | HHL |
| W_RG3 | HLH |
| W_RG4 | HLL |
| W_RG5 | LHH |
| W_RG6 | LHL |
| W_RG7 | LLH |
| W_RG8 | LLL |

FIG. 6

| | CH1 | CH2 | CH3 | CH4 | CH5 | CH6 | CH7 | CH8 | CH9 | CH10 | CH11 | CH12 | CH13 | CH14 | CH15 |
|---|---|---|---|---|---|---|---|---|---|---|---|---|---|---|---|
| LN1 | 0 | 48 | 48 | 0 | 255 | 255 | 0 | 0 | 0 | 0 | 0 | 0 | 0 | 0 | 0 |
| LN2 | 0 | 0 | 0 | 0 | 0 | 64 | 64 | 0 | 32 | 32 | 0 | 0 | 0 | 128 | 128 |
| DIFF | 0 | 48 | 48 | 0 | 255 | 191 | 64 | 0 | 32 | 32 | 0 | 0 | 0 | 128 | 128 |

| | CH16 | CH17 | CH18 | CH19 | CH20 | CH21 | CH22 | CH23 | CH24 | CH25 | CH26 | CH27 | CH28 | CH29 | CH30 |
|---|---|---|---|---|---|---|---|---|---|---|---|---|---|---|---|
| LN1 | 224 | 224 | 0 | 0 | 0 | 0 | 0 | 192 | 192 | 0 | 0 | 0 | 0 | 0 | 0 |
| LN2 | 128 | 0 | 0 | 0 | 255 | 224 | 224 | 224 | 0 | 0 | 0 | 255 | 255 | 192 | 192 |
| DIFF | 96 | 96 | 0 | 0 | 255 | 224 | 224 | 48 | 192 | 0 | 0 | 255 | 255 | 192 | 192 |

FIG. 7A

| DIFF | CH | WT | Sum |
|---|---|---|---|
| D_RG1(255~192) | 10 | WT1(15) | 150 |
| D_RG2(191~128) | 3 | WT2(11) | 33 |
| D_RG3(127~96) | 1 | WT3(8) | 8 |
| D_RG4(95~64) | 1 | WT4(5) | 5 |
| D_RG5(63~32) | 5 | WT5(3) | 15 |
| D_RG6(31~16) | 0 | WT6(1) | 0 |
| D_RG7(15~8) | 0 | WT7(0) | 0 |

AWT: 10.55

FIG. 7B

| AWT | PWRC | IB |
|---|---|---|
| W_RG1(15~13) | HHH | 12μA |
| W_RG2(12~10) | HHL | 10μA |
| W_RG3(9~8) | HLH | 8μA |
| W_RG4(7~6) | HLL | 6μA |
| W_RG5(5~4) | LHH | 4μA |
| W_RG6(3~2) | LHL | 2μA |
| W_RG7(1) | LLH | 0.8μA |
| W_RG7(0) | LLL | 0.2μA |

FIG. 7C

DISPLAY DEVICE

CROSS-REFERENCE TO RELATED APPLICATION

This application claims the priority of Republic of Korea Patent Application No. 10-2024-0180597 filed on Dec. 6, 2024, which is hereby incorporated by reference in its entirety.

BACKGROUND

Field

The present specification relates to a display device, and more particularly, to a display device capable of controlling a drive current.

Description of the Related Art

A display device includes a display panel including a plurality of pixels, a gate driver and a data driver configured to operate the display panel. When a gate signal, which is outputted from the gate driver, and a data signal, which is outputted from the data driver, are supplied to the plurality of pixels, the pixels may emit light with luminance corresponding to a drive current, thereby displaying images.

The data driver includes at least one source driving integrated circuit (SDIC), and the source driving integrated circuit supplies data signals to the plurality of pixels through a plurality of data lines connected to a plurality of output buffers.

The source driving integrated circuit may reduce power consumption by controlling the drive current of the output buffer in response to a power control signal calculated on the basis of a difference between amounts of change in data signal. However, all the output buffers included in one source driving integrated circuit control the drive currents in response to the same power control signal. In case that the amount of change in data varies for each output buffer, the power control signal may be overset. In this case, the drive currents may be excessively outputted from the plurality of output buffers, which may cause a problem in that power consumption of the display device increases unnecessarily.

SUMMARY

An object to be achieved by the present specification is to provide a display device capable of reducing power consumption.

Objects of the present disclosure are not limited to the above-mentioned objects, and other objects, which are not mentioned above, can be clearly understood by those skilled in the art from the following descriptions.

According to an embodiment of the present disclosure, a display device comprises: a timing controller configured to generate image data and a data control signal based on an input image and a control signal; a data driver including a plurality of output buffers and a plurality of channels that are respectively connected to the plurality of output buffers, the data driver configured to generate a plurality of data signals based on the image data and the data control signal and output the plurality of data signals through the plurality of output buffers; and a display panel comprising a plurality of data lines connected to the plurality of output buffers and a plurality of pixels connected to the plurality of data lines, wherein the timing controller compares the image data in horizontal line units of pixels from the plurality of pixels for each of the plurality of channels and controls a magnitude of a drive current of the plurality of output buffers based on an amount of change in the image data compared in the horizontal line units for each of the plurality of channels.

In one embodiment, a display device comprises: a display panel comprising a plurality of data lines, a plurality of gate lines, and a plurality of pixels connected to the plurality of data lines and the plurality of gate lines; a data driver including a plurality of output buffers and a plurality of channels that are each connected to a corresponding one of the plurality of output buffers and a corresponding one of the plurality of data lines, the data driver configured to generate a plurality of data signals corresponding to first image data of a first line of pixels from the plurality of pixels and output the plurality of data signals to the plurality of channels through the plurality of output buffers; and a timing controller configured to output a power control signal to the data driver, the power control signal having a value that is based on a difference between the first image data of the first line of pixels and second image data of a second line of pixels from the plurality of pixels, wherein the data driver is configured to select a magnitude of a drive current from a plurality of different magnitudes based on the value of the power control signal and apply the drive current having the selected magnitude to the plurality of output buffers, the applied drive current amplifying the plurality of data signals corresponding to the first image data.

Other detailed matters of the exemplary embodiments are included in the detailed description and the drawings.

According to the present specification, it is possible to compare, in the horizontal line unit, the image data for each of the plurality of channels included in the data driver, classify the amounts of change in image data in the horizontal line unit for each of the channels in accordance with a preset range, calculate the average weight value by applying the weight value corresponding to the corresponding range to the number of channels included in each of the ranges, and then generate the power control signal corresponding to the average weight value. Therefore, the drive currents of the plurality of output buffers are controlled by applying the weight value, which corresponds to the magnitude of the amount of change, not only to the amount of change in image data for a particular channel but also to the amount of change in image data for all the channels, such that the operation may be performed with low power consumption, and the power consumption may be more effectively reduced.

The effects according to the present disclosure are not limited to the contents exemplified above, and more various effects are included in the present specification.

BRIEF DESCRIPTION OF DRAWINGS

The above and other aspects, features and other advantages of the present disclosure will be more clearly understood from the following detailed description taken in conjunction with the accompanying drawings, in which:

FIG. 5 is a view for explaining an example of a first lookup table stored in a memory included in the timing controller in FIG. 4 according to an embodiment of the present specification;

FIG. 6 is a view for explaining an example of a second lookup table stored in the memory included in the timing controller in FIG. 4 according to an embodiment of the present specification; and FIGS. 7A to 7C are views for explaining an example of an operation of the timing controller in FIG. 4 according to an embodiment of the present specification.

DETAILED DESCRIPTION

Figure 1:
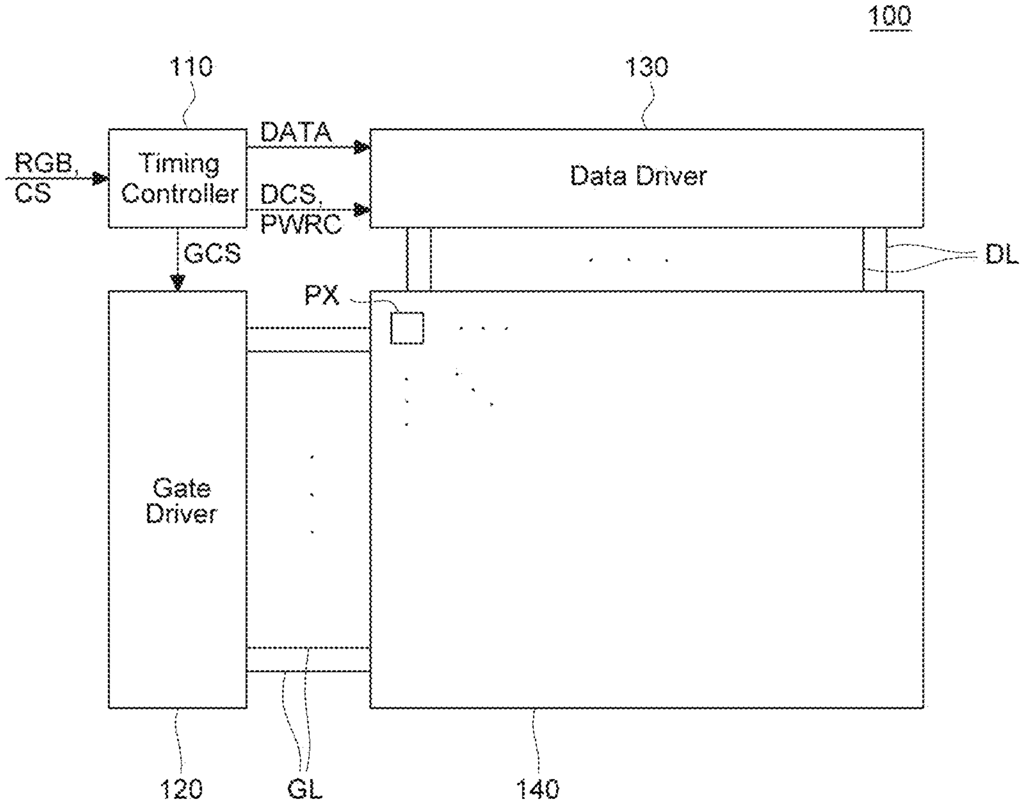
FIG. 1 is a block diagram illustrating a display device according to an embodiment of the present specification.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “comprising” used herein are generally intended to allow other components to be added unless the terms are used with the term “only”. Any references to singular may include plural unless expressly stated otherwise.

Components are interpreted to include an ordinary error range even if not expressly stated.

When the position relation between two parts is described using the terms such as “on”, “above”, “below”, and “next”, one or more parts may be positioned between the two parts unless the terms are used with the term “immediately” or “directly”.

When explaining temporal relationships, terms such as “after,” “following,” “subsequent to,” or “before,” etc., may include non-consecutive cases unless terms like “immediately” or “directly” are used.

Terms such as “first,” “second,” etc. are used to describe various components, but these components are not limited by these terms. These terms are merely used to distinguish one component from another. Therefore, a first component mentioned herein could be a second component within the technical scope of the present disclosure.

In describing the components of the present disclosure, terms such as first, second, A, B, (a), or (b) may be used. These terms are only intended to distinguish that one component from other components, and the nature, order, sequence, or number of the respective component is not limited by these terms.

When a component is described as being “connected,” “coupled,” “joined,” or “attached” to another component, it should be understood that the component may be directly connected, coupled, joined, or attached to the other component, but unless explicitly specified otherwise, it may also be indirectly connected, coupled, joined, or attached with another component intervening between each component.

When a component or layer is described as being “in contact with” or “overlapping” another component or layer, the component or layer may directly contact or overlap the other component or layer, but unless explicitly specified otherwise, it should be understood that it may also indirectly contact or overlap with another component intervening between each component.

The term “at least one” should be understood to include all combinations of one or more of the associated components. For example, “at least one of first, second, and third components” means not only the first, second, or third component, but also includes all combinations of two or more components from among the first, second, and third components.

The terms “first direction”, “second direction”, “third direction”, “X-axis direction”, “Y-axis direction”, and “Z-axis direction” should not be interpreted solely as geometric relationships perpendicular to each other, but may indicate broader directionality within the range where the configuration of the present disclosure can function.

The features of various embodiments in the present disclosure may be partially or wholly combined or associated with each other, various technical interlocking and operations are possible, and each embodiment may be implemented independently of each other or may be implemented together in an associated relationship.

Hereinafter, a display apparatus according to exemplary embodiments of the present disclosure will be described in detail with reference to accompanying drawings.

FIG. 1 is a block diagram illustrating a display device according to an embodiment of the present specification.

Figure 2:
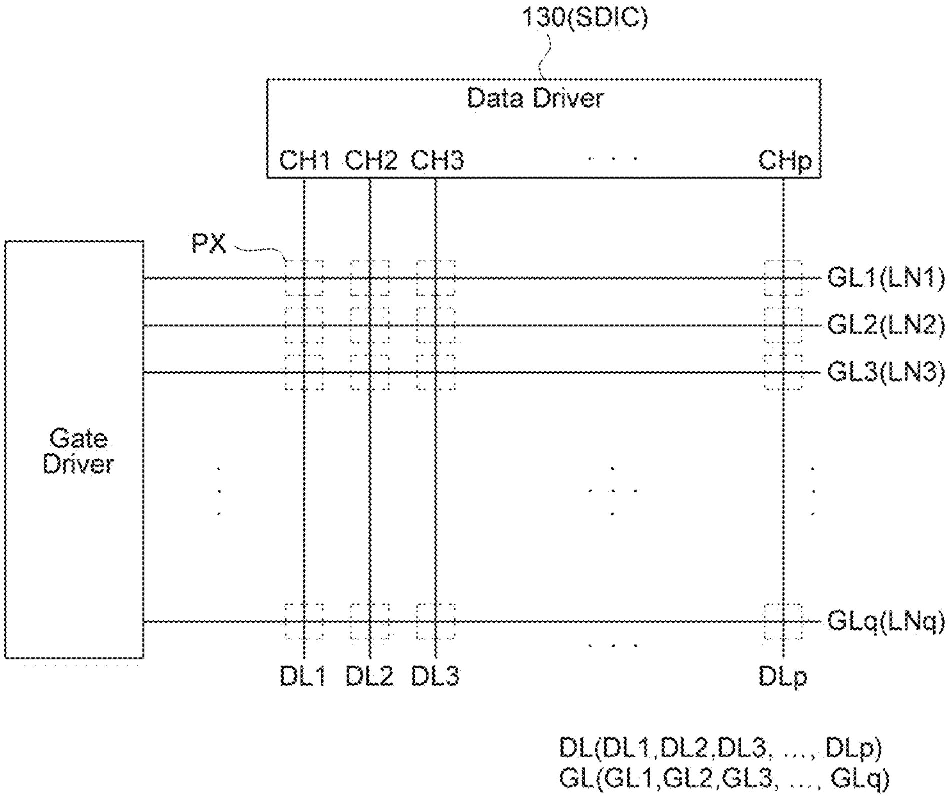
FIG. 2 is a view for explaining one example of a connection relationship between a data driver and a plurality of data lines and a connection relationship between a gate driver and a plurality of gate line included in the display device in FIG. 1 according to an embodiment of the present specification.

FIG. 2 is a view for explaining one example of a connection relationship between a data driver and a plurality of data lines and a connection relationship between a gate driver and a plurality of gate line included in the display device in FIG. 1 according to an embodiment of the present specification.

With reference to FIG. 1, a display device 100 according to an embodiment of the present specification may include a timing controller 110, a gate driver 120, a data driver 130, and a display panel 140.

The display panel 140 may create an image to be provided to a user. For example, the display panel 140 may include a plurality of pixels PX in which pixel circuits are respectively disposed. The plurality of pixels PX may each be connected to a corresponding gate line GL and a corresponding data line DL and display images in response to a gate signal provided to the gate line GL and a data signal provided to the data line DL.

For example, with reference further to FIG. 2, the plurality of pixels PX may be disposed to be spaced apart from one another in a first direction, e.g., a horizontal direction, thereby defining a plurality of pixel rows. The plurality of pixel rows may be defined as a plurality of horizontal lines LN1 to LNq (here, q is an integer larger than 3). The plurality of horizontal lines LN1 to LNq may respectively correspond to the plurality of gate lines GL1 to GLq. Therefore, the pixels PX disposed on the same horizontal lines LN1 to LNq may be connected to the same gate lines GL1 to GLq and connected to the different data lines DL.

That is, there is a one-to-one relationship between a horizontal line and a corresponding gate line.

In addition, the plurality of pixels PX may be disposed to be spaced apart from one another in a second direction, e.g., a vertical direction, thereby defining a plurality of pixel columns. The plurality of pixel columns may respectively correspond to a plurality of data lines DL1 to DLp connected to a plurality of channels CH1 to CHp of the data driver 130 (here, p is an integer larger than 3). Therefore, the pixels PX disposed on the same pixel columns may be connected to the same data lines DL1 to DLp and connected to the different gate lines GL.

With reference back to FIG. 1, the timing controller 110 may control the gate driver 120 and the data driver 130 on the basis of an input image RGB and a control signal CS provided from the outside, e.g., from a host system or the like. For example, the input control signal CS may include timing signals such as a horizontal synchronizing signal, a vertical synchronizing signal, a data enable signal, and a clock signal. The timing controller 110 may generate a gate control signal GCS and a data control signal DCS on the basis of the control signal CS. The gate control signal GCS may be provided to the gate driver 120, and the data control signal DCS may be provided to the data driver 130.

In addition, the timing controller 110 may create image data DATA by realigning the input image RGB in a digital video data format to suit the resolution of the display panel 140 and provide the image data DATA to the data driver 130.

According to the embodiment, the timing controller 110 may transmit or receive signals to or from other components through one or more predetermined interfaces. For example, the interface may include an embedded clock point-point interface (EPI). In this case, the timing controller 110 may configure or generate a power control signal PWRC, which will be described below, in an EPI transmission format, together with the data control signal DCS and the image data DATA and provide the power control signal PWRC to the data driver 130. However, the embodiment of the present specification is not limited thereto. The interface may include a serial peripheral interface (SPI), a low voltage differential signaling (LVDS) interface, and the like.

The gate driver 120 may generate gate signals on the basis of the gate control signal GCS and output the gate signals to the plurality of gate lines GL. For example, the gate driver 120 may sequentially output the gate signals to the plurality of gate lines GL in the units of the plurality of horizontal lines LN1 to LNq.

On the basis of the data control signal DCS, the data driver 130 may convert the image data DATA in the digital format, which is provided from the timing controller 110, into the data signal in the analog format and supply the image data DATA to the plurality of data lines DL.

For example, the data driver 130 may generate a sampling signal in response to the data control signal DCS, convert the image data DATA into the data signal (data voltage) in the analog format by latching the image data DATA in response to the sampling signal, and supply the data signal to the plurality of data lines DL. For example, the data control signal DCS may include a data clock signal, a line latch signal, and the like for generating the data signal.

In the embodiment, the data driver 130 may include at least one source driving integrated circuit SDIC. In this case, as illustrated in FIG. 2, at least one source driving integrated circuit SDIC may separate the data control signal DCS, the image data DATA, and the power control signal PWRC from the EPI transmission format transmitted from the timing controller 110. In addition, at least one source driving integrated circuit SDIC may generate the data signal on the basis of the data control signal DCS and the image data DATA and supply the data signals to the plurality of data lines DL1 to DLp through the plurality of channels CH1 to CHp.

Meanwhile, FIG. 2 illustrates that the data driver 130 includes one source driving integrated circuit SDIC, but this configuration is illustrative. The data driver 130 may include two or more source driving integrated circuits SDIC respectively including the plurality of channels CH1 to CHp. The number of source driving integrated circuits SDIC may be determined depending on a magnitude, resolution, and the like of the display panel 140. Hereinafter, for convenience of description, the description will be described with reference to the configuration in which the data driver 130 includes one source driving integrated circuit SDIC.

In the embodiment, the timing controller 110 may compare the image data DATA in the units of the horizontal lines LN1 to LNq for each of the plurality of channels CH1 to CHp of the data driver 130 and generate the power control signal PWRC on the basis of the comparison result. The power control signal PWRC may be provided to the data driver 130, and the data driver 130 may control a magnitude of drive currents of the plurality of output buffers connected to the plurality of channels CH1 to CHp, e.g., the plurality of data lines DL1 to DLp on the basis of the power control signal PWRC, thereby reducing power consumption.

In this case, the timing controller 110 may compare the image data DATA in the units of the horizontal lines LN1 to LNq for each of the plurality of channels CH1 to CHp, classify amounts of change in image data DATA in the horizontal line unit for each channel in accordance with a preset range, obtain an average value by applying a weight value corresponding to the corresponding range to the number of channels included in each of the range, and then generate the power control signal PWRC corresponding to the corresponding average value. Therefore, the display device 100 according to the embodiment of the present specification may more effectively reduce power consumption. A specific description will be described with reference to FIGS. 3 to 7C.

Figure 3:
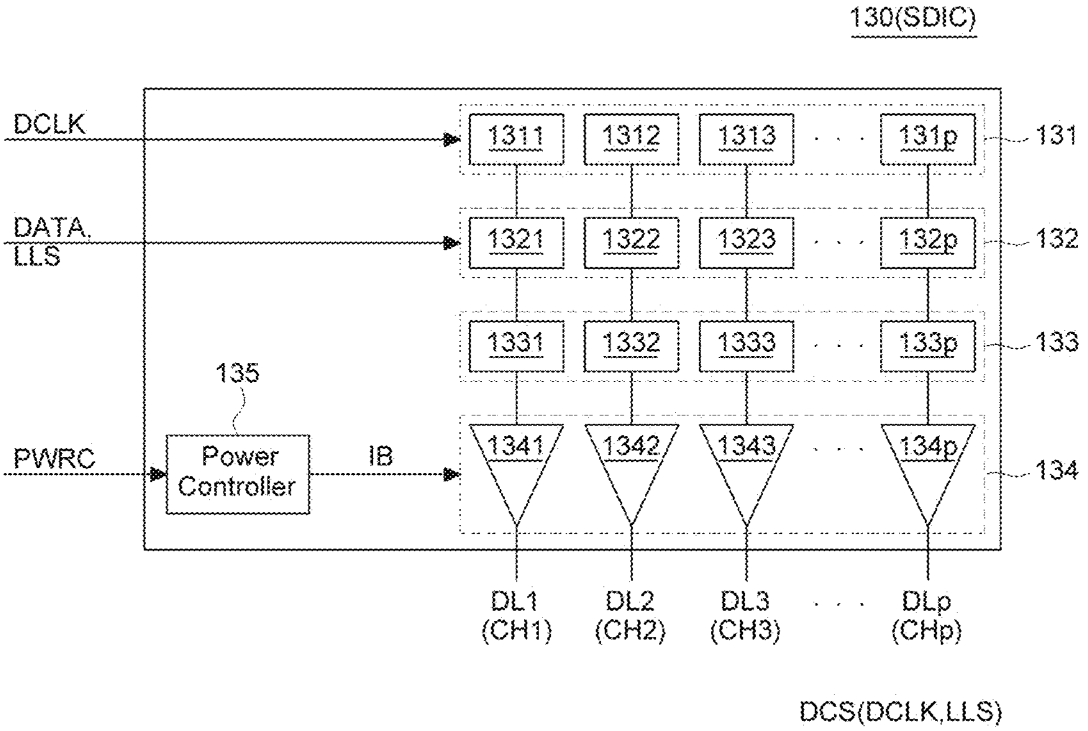
FIG. 3 is a block diagram illustrating an example of the data driver included in the display device in FIG. 1 according to an embodiment of the present specification.

FIG. 3 is a block diagram illustrating an example of the data driver included in the display device in FIG. 1 according to an embodiment of the present specification.

With reference to FIGS. 1 to 3, the data driver 130, e.g., at least one source driving integrated circuit SDIC included in the data driver 130 may include a register part 131, a latch part 132, a digital-analog conversion part 133, and a buffer part 134.

The register part 131 (e.g., a circuit) may sequentially activate a plurality of latch clock signals by being synchronized with a data clock signal DCLK included in the data control signal DCS and provide the plurality of latch clock signals to the latch part 132. For example, the register part 131 may include a plurality of shift registers 1311 to 131*p* that each respectively correspond to one of the plurality of channels CH1 to CHp of the source driving integrated circuit SDIC.

The latch part 132 (e.g., a circuit) may receive the plurality of latch clock signals sequentially provided from the plurality of shift registers 1311 to 131*p* and sample and latch the image data DATA in the digital format by being synchronized with the plurality of latch clock signals. In addition, the latch part 132 may provide the image data DATA in the digital format, which are latched in response to a line latch signal LLS included in the data control signal DCS, to the digital-analog conversion part 133.

For example, the latch part 132 includes a plurality of latch circuits 1321 to 132*p* that each respectively correspond to one of the plurality of channels CH1 to CHp of the source driving integrated circuit SDIC. The plurality of latch circuits 1321 to 132*p* latch the sampled image data DATA in one pixel row unit, e.g., in the units of the horizontal lines LN1 to LNq and then output the image data DATA to the digital-analog conversion part 133 in the units of the horizontal lines LN1 to LNq in response to the line latch signal LLS.

The digital-analog conversion part 133 (e.g., a circuit) may convert the image data DATA in the digital format, which is provided from the plurality of latch circuits 1321 to 132*p*, into analog signals. For example, the digital-analog conversion part 133 may convert the image data DATA in the digital format into the analog signals, i.e., gradation voltages by using a reference voltage and provide the buffer part 134 with the converted analog signal as a data signal (data voltage). For example, the digital-analog conversion part 133 may include a plurality of conversion circuits 1331 to 133P that each respectively corresponding to one of the plurality of channels CH1 to CHp of the source driving integrated circuit SDIC.

For example, the digital-analog conversion part 133 may include a voltage generation part and a decoder. The voltage generation part (e.g., a circuit) may generate a plurality of gamma voltages for expressing a predetermined gradation by using the reference voltage. For example, the voltage generation part may generate a plurality of gamma voltages by voltage-distributing the reference voltage by using a plurality of resistors connected in series between the reference voltage and a ground voltage. The decoder (e.g., a circuit) may receive the plurality of gamma voltages provided from the voltage generation part and output the corresponding gamma voltage, among the plurality of gamma voltages, as the data signal (data voltage) to the buffer part 134 in accordance with the image data DATA inputted from the latch part 132.

The buffer part 134 (e.g. a circuit) may output a plurality of data signals (a plurality of data voltages) in the analog format, which are outputted from the plurality of conversion circuits 1331 to 133P included in the digital-analog conversion part 133, to the plurality of channels CH1 to CHp. For example, the buffer part 134 may include a plurality of output buffers 1341 to 134*p* corresponding to the plurality of channels CH1 to CHp. The plurality of output buffers 1341 to 134*p* may output the data signals to the data lines DL1 to DLp of the corresponding channel among the plurality of channels CH1 to CHp. For example, the plurality of output buffers 1341 to 134*p* may each include an amplifier.

In the embodiment, the data driver 130, e.g., at least one source driving integrated circuit SDIC included in the data driver 130 may further include a power controller 135.

The power controller 135 may control a magnitude of drive currents of the plurality of output buffers 1341 to 134*p* included in the buffer part 134 on the basis of the power control signal PWRC provided from the timing controller 110.

For example, the power controller 135 may control the magnitude (e.g., the amount of electric current) of a bias current IB to be applied to the plurality of output buffers 1341 to 134*p* included in the buffer part 134 on the basis of the power control signal PWRC. The magnitude of the bias current IB is selected from a plurality of different magnitudes based on the value of the power control signal PWRC. In this case, the plurality of output buffers 1341 to 134*p* may amplify the plurality of data signals (data voltages) in the analog format on the basis of the bias current IB provided from the power controller 135 output the plurality of amplified data signals to the plurality of data lines DL1 to DLp. The amount of change in data of the plurality of data signals (data voltages) outputted by the plurality of output buffers 1341 to 134*p*, e.g., an output slew rate may be controlled in accordance with the amount of electric current of the bias current IB applied to the plurality of output buffers 1341 to 134*p*.

For example, the output slew rate of the plurality of output buffers 1341 to 134*p* increases as a value of the bias current IB increases, and the output slew rate of the plurality of output buffers 1341 to 134*p* decreases as the value of the bias current IB decreases. Specifically, as the output slew rate increases, the amount of change in data signal, i.e., data voltage increases for a unit time increases, such that a target value of the data voltage may be reached within a short time in comparison with a case in which the output slew rate is low. Therefore, the power controller 135 may control power consumption of the plurality of output buffers 1341 to 134*p* and power consumption of the data driver 130 by controlling the amount of electric current of the bias current IB in response to the power control signal PWRC generated on the basis of the amount of change in image data DATA.

Figure 4:
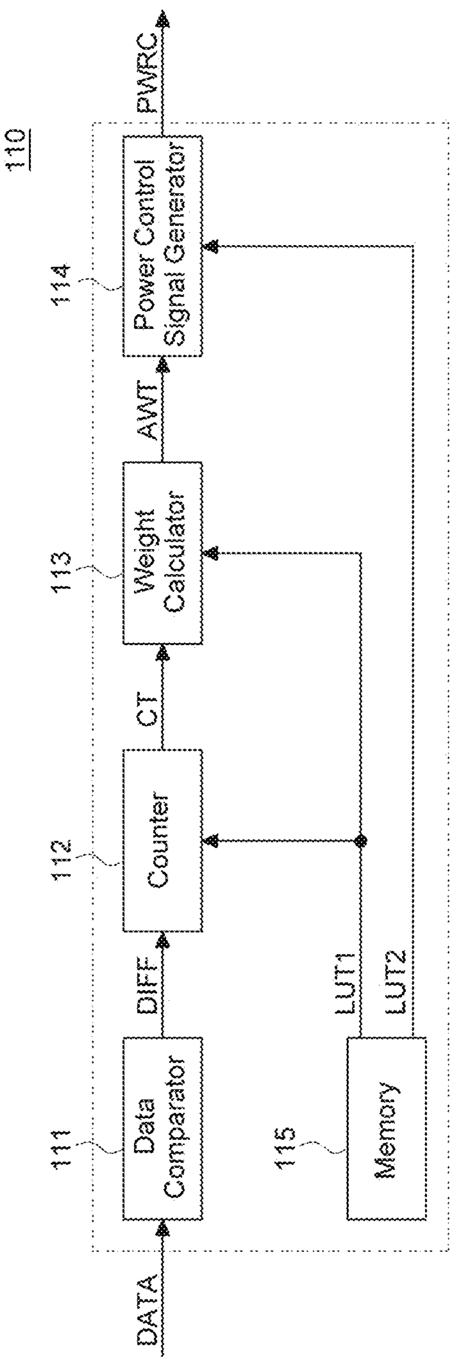
FIG. 4 is a block diagram illustrating an example of a timing controller included in the display device in FIG. 1 according to an embodiment of the present specification.

FIG. 4 is a block diagram illustrating an example of the timing controller included in the display device in FIG. 1 according to an embodiment of the present specification.

FIG. 5 is a view for explaining an example of a first lookup table stored in a memory included in the timing controller in FIG. 4 according to an embodiment of the present specification.

FIG. 6 is a view for explaining an example of a second lookup table stored in the memory included in the timing controller in FIG. 4 according to an embodiment of the present specification.

With reference to FIGS. 1 to 4, the timing controller 110 may compare the amounts of change in image data DATA in the units of the horizontal lines LN1 to LNq for each of the plurality of channels CH1 to CHp of at least one source driving integrated circuit SDIC included in the data driver 130 and generate the power control signal PWRC on the basis of the comparison result.

To this end, in the embodiment, the timing controller 110 may include a data comparison part 111, a counter part 112, a weight value calculation part 113, and a power control signal generation part 114. In the embodiment, the timing controller 110 may further include a memory 115. For example, the memory 115 may include a first lookup table LUT1 and a second lookup table LUT2 used to generate the power control signal PWRC. The memory 115 may be a non-volatile memory device such as a flash memory device. However, the present specification is not limited thereto.

The data comparison part 111 (e.g., a circuit) may create change amount data DIFF by calculating the amount of change in image data DATA in the units of the horizontal lines LN1 to LNq for each of the plurality of channels CH1 to CHp.

For example, the data comparison part 111 may calculate the amount of change in image data DATA corresponding to two adjacent horizontal lines among the plurality of horizontal lines LN1 to LNq for each of the plurality of channels CH1 to CHp. For example, the data comparison part 111 may create the change amount data DIFF by calculating, as the amount of change, a difference in absolute value between first image data DATA corresponding to a previous horizontal line, e.g., a first horizontal line LN1 of pixels and second image data DATA corresponding to a current horizontal line, e.g., a second horizontal line LN2 adjacent to the first horizontal line LN1 for each of the plurality of channels CH1 to CHp.

The counter part 112 (e.g., a circuit) may receive the change amount data DIFF from the data comparison part 111 and classify the amounts of change in image data DATA of the channel in accordance with a preset range on the basis of the change amount data DIFF. For example, the counter part 112 may classify the amounts of change in image data DATA of each of the channels in accordance with the preset range by counting the total number of channels having the amount of change in image data DATA corresponding to a plurality of data change amount range included in the first lookup table LUT1 on the basis of the first lookup table LUT1 received from the memory 115, and the counter part 112 may create counting data CT including information on the classification result. That is, the counter part 112 may classify the change amount data for each of the plurality of channels CH1 to CHp to a preset range of data change from a plurality of preset ranges of data change stored in the first lookup table LUT1, and count a total number of channels that are classified in each of the plurality of preset ranges.

With reference further to FIG. 5 in order to more specifically describe the first lookup table LUT1, the first lookup table LUT1 may include a plurality of data change amount ranges D_RG1 to D_RG7 (e.g., a plurality of preset ranges of data change), and a plurality of weight values WT respectively corresponding to the plurality of data change amount ranges D_RG1 to D_RG7. Thus, each weight value is associated with a corresponding one data change amount range. For example, in case that the image data DATA are configured as 8-bit data, each data value has a value between 0 and 255, such that a minimum value and a maximum value the amount of change in image data DATA may be 0 and 255, respectively. Therefore, the plurality of data change amount ranges D_RG1 to D_RG7 may have any one range among the range between 0 and 255. For example, as illustrated in FIG. 5, the plurality of data change amount ranges D_RG1 to D_RG7 may be classified into seven data change amount ranges. Therefore, the first lookup table LUT1 may include first to seventh weight values WT1 to WT7 respectively corresponding to first to seventh data change amount ranges D_RG1 to D_RG7. However, the present specification is not limited thereto. In the embodiment, the plurality of data change amount ranges D_RG1 to D_RG7 may be determined depending on the output slew rate of the plurality of output buffers 1341 to 134*p* included in the buffer part 134.

According to the embodiment, the plurality of data change amount ranges D_RG1 to D_RG7 may not include some ranges among the ranges between 0 and 255. That is, the plurality of data change amount ranges D_RG1 to D_RG7 collectively include a portion of all possible ranges of the amount of change in the image data DATA without covering an entirety of all the possible ranges. For example, in case that a difference in amount of change in image data DATA between the previous horizontal line and the current horizontal line, e.g., the first horizontal line LN1 and the second horizontal line LN2 is insignificant, it is not necessary to increase the value of the bias current IB. Therefore, the buffer part 134 may operate normally even though the weight value is not applied. In this case, because the value of the bias current IB is small, power consumption may be effectively reduced. Therefore, the plurality of data change amount ranges D_RG1 to D_RG7 may not include a range having a relatively small value including 0. For example, the plurality of data change amount ranges D_RG1 to D_RG7 may have any one range among the ranges between 8 to 255, except for 0 to 7, i.e., a relatively small amount of change in data. However, the present specification is not limited thereto.

Therefore, the counter part 112 may receive the change amount data DIFF and the first lookup table LUT1 and classify the amounts of change in image data DATA of each of the channels by counting the number of channels having the amount of change in image data DATA corresponding to the plurality of data change amount ranges D_RG1 to D_RG7 of the first lookup table LUT1 on the basis of the change amount data DIFF.

With reference to FIG. 4, the weight value calculation part 113 (e.g., a circuit) may receive the counting data CT from the counter part 112, apply the weight value, which corresponds to the corresponding range, to the number of channels respectively included in the plurality of data change amount ranges D_RG1 to D_RG7 preset on the basis of the counting data CT, and calculate an average value, e.g., an average weight value AWT.

For example, with reference to FIG. 5 together, the weight value calculation part 113 may receive the first lookup table LUT1 from the memory 115 and calculate an individual weight sum value by multiplying the number of channels, which are included in the corresponding data change amount range for each of the plurality of data change amount ranges D_RG1 to D_RG7, by the weight values WT1 to WT7 in the corresponding data change amount range on the basis of the counting data CT. For example, the weight value calculation part 113 may calculate a first individual weight sum value by multiplying the number of channels corresponding to the first data change amount range D_RG1 by the first weight value WT1 and calculate a second individual weight sum value by multiplying the number of channels corresponding to the second data change amount range D_RG2 by the second weight value WT2. With substantially the same or similar method, the weight value calculation part 113 may also calculate third to seventh individual weight sum values related to the third to seventh data change amount ranges D_RG3 to D_RG7. Thus, the weight value calculation part 113 calculates, for each of the plurality of data change amount ranges D_RG1 to D_RG7, a weight sum value by applying a weight value that corresponds to the data change amount range to the total number of channels that are classified to the data change amount range.

Meanwhile, as a difference in amount of change in image data DATA between the two adjacent horizontal lines, e.g., the first horizontal line LN1 and the second horizontal line LN2 decreases, the sufficient output slew rate of the output buffers 1341 to 134*p* may be ensured even though the value of the bias current IB is relatively small. Therefore, the value of the weight value WT may decrease as the data change amount ranges D_RG1 to D_RG7 have ranges with small values. For example, the first weight value WT1, which corresponds to the first data change amount range D_RG1 having the range of the largest value among the plurality of data change amount ranges D_RG1 to D_RG7, may have a largest value, and the seventh weight value WT7, which corresponds to the seventh data change amount range D_RG7 having the range of the smallest value, may have a smallest value.

In addition, the weight value calculation part 113 may calculate an average value of the plurality of individual weight sum values respectively corresponding to the plurality of data change amount ranges D_RG1 to D_RG7 as the average weight value AWT. For example, the weight value calculation part 113 may calculate a value, which is made by dividing the plurality of individual weight sum values by the total number of channels included in the plurality of data change amount ranges D_RG1 to D_RG7, as the average weight value AWT.

In the embodiment, in case that the plurality of data change amount ranges D_RG1 to D_RG7 do not include some ranges among the ranges between 0 and 255 as described above, the channel, which corresponds to a range that is not included in any range among the plurality of data change amount ranges D_RG1 to D_RG7, may not be included in the number of channels by which the plurality of individual weight sum values are divided when the average weight value AWT is calculated by dividing the plurality of individual weight sum values by the number of channels.

For example, in case that the number of channels included in 0 to 7 is a (here, a is an integer of 0 or more) in case that the plurality of data change amount ranges D_RG1 to D_RG7 have any one range among the range between 8 and 255, except for 0 to 7, as described above, the weight value calculation part 113 may calculate a value, which is made by dividing the plurality of individual weight sum values by a value made by subtracting a from the total number of channels, as the average weight value AWT.

With reference to FIG. 4, the power control signal generation part 114 may receive the average weight value AWT from the weight value calculation part 113 and generate the power control signal PWRC corresponding to the average weight value AWT. For example, the power control signal generation part 114 may generate the power control signal PWRC, which corresponds to the average weight value AWT included in the second lookup table LUT2, on the basis of the second lookup table LUT2 received from the memory 115.

With reference further to FIG. 6 in order to more specifically describe the second lookup table LUT2, the second lookup table LUT2 may include a plurality of weight value ranges W_RG1 to W_RG8, and a plurality of different values of the power control signal PWRC that each correspond to one of the plurality of weight value ranges W_RG1 to W_RG8.

For example, the values of the power control signals PWRC may be 3 bits, i.e., eight values. The amount of electric current of the bias current IB, which has been described with reference to FIG. 3, may be determined in response to each of the values of the power control signal PWRC. For example, as illustrated in FIG. 6, the values of the power control signal PWRC include "HHH," "HHL," "HLH," "HLL," "LHH," "LHL," "LLH," and "LLL", the amount of electric current of the bias current IB may have the largest value while corresponding to the power control signal PWRC having the "HHH" value, and the amount of electric current of the bias current IB may have the smallest value while corresponding to the power control signal PWRC having the "LLL" value.

In case that the values of the power control signal PWRC are eight values as described above, the plurality of weight value ranges W_RG1 to W_RG8 related to the average weight value AWT may also be classified into eight weight value ranges. In one embodiment, the power control signal generation part 114 is configured to generate the power control signal PWRC by mapping the average weight value to a weight value range from the plurality of weight value ranges W_RG1 to W_RG8 that includes the average weight value and determine a value from the plurality of values of the power control signal PWRC that corresponds to the weight value range.

Meanwhile, FIG. 4 illustrates that the counter part 112 and the weight value calculation part 113 operate by receiving the first lookup table LUT1 from the memory 115, and the power control signal generation part 114 operates by receiving the second lookup table LUT2 from the memory 115. However, the embodiment of the present specification is not limited thereto. For example, at least one of the counter part 112, the weight value calculation part 113, and the power control signal generation part 114 may operate by using the first lookup table LUT1 and/or the second lookup table LUT2 stored in a separate storage device included therein or operate by using a separate algorithm or equation that is not a lookup table.

FIGS. 7A to 7C are views for explaining an example of an operation of the timing controller in FIG. 4 according to an embodiment of the present specification.

Meanwhile, FIGS. 7A to 7C are views for exemplarily explaining a specific operation of the timing controller 110 described with reference to FIGS. 1 to 6. FIG. 7A exemplarily illustrates that the data driver 130, e.g., the source driving integrated circuit SDIC has thirty channels CH1 to CH30, and the timing controller 110 compares the amounts of change in image data DATA of the previous horizontal line and the current horizontal line, i.e., the first horizontal line LN1 and the second horizontal line LN2.

In addition, FIG. 7B exemplarily illustrates a case in which in the first lookup table LUT1 described with reference to FIG. 5, the plurality of data change amount ranges D_RG1 to D_RG7 are classified into seven data change amount ranges, the plurality of data change amount ranges D_RG1 to D_RG7 are respectively "255 to 192," "191 to 128," "127 to 96," "95 to 64," "63 to 32," "31 to 16," and "15 to 8", and the weight values WT1 to WT7 respectively corresponding to the plurality of data change amount ranges D_RG1 to D_RG7 are respectively 15, 11, 8, 5, 3, 1, and 9.

Meanwhile, as described with reference to FIGS. 4 to 6, the plurality of data change amount ranges D_RG1 to D_RG7 may have any one range among the ranges between 8 and 255, except for 0 to 7, i.e., a relatively small amount of change in data. The first weight value WT1, which corresponds to the first data change amount range D_RG1 having the range of the largest value among the plurality of data change amount ranges D_RG1 to D_RG7, may have the largest value, e.g., a value of 15, and the seventh weight value WT7, which corresponds to the seventh data change amount range D_RG7 having the range of the smallest value, may have the smallest value, e.g., a value of 0.

In addition, FIG. 7C exemplarily illustrates a case in which in the second lookup table LUT2 described with reference to FIG. 6, the values of the power control signal PWRC may be 3 bits, i.e., eight values, and the plurality of weight value ranges W_RG1 to W_RG8 are respectively "15 to 13," "12 to 10," "9 to 8," "7 to 6," "5 to 4," "3 to 2," "1," and"0" while corresponding to the eight values of the power control signal PWRC, e.g., "HHH," "HHL," "HLH," "HLL," "LHH," "LHL," "LLH," and "LLL".

However, this configuration is illustrative for convenience of description. The number of channels included in the source driving integrated circuit SDIC, and the previous horizontal line, the current horizontal line, the first lookup table LUT1, and the second lookup table LUT2, which are used for the timing controller 110 to compare the image data DATA, may be variously modified and carried out.

First, with reference to FIG. 7A, the data comparison part 111 may calculate the amount of change in image data DATA in the horizontal line unit for each of the plurality of channels CH1 to CH30. For example, the data comparison part 111 may create the change amount data DIFF by calculating a difference in absolute value between the data of the first horizontal line LN1 and the data of the second horizontal line LN2 as the amount of change for each of the plurality of channels CH1 to CH30.

Next, with reference further to FIG. 7B, the counter part 112 may classify the amounts of change in image data DATA of each of the channels in accordance with a preset range by counting the number of channels having the amount of change in image data DATA included in each of the plurality of data change amount ranges D_RG1 to D_RG7 on the basis of the change amount data DIFF created by the data comparison part 111.

For example, with reference to FIGS. 7A and 7B, among the plurality of channels CH1 to CH30, ten channels may be included in the first data change amount range D_RG1 having the change amount range of "255 to 192", three channels may be included in the second data change amount range D_RG2 having the change amount range of "191 to 128", one channel may be included in the third data change amount range D_RG3 having the change amount range of "127 to 96", one channel may be included in the fourth data change amount range D_RG4 having the change amount range of "95 to 64", five channels may be included in the fifth data change amount range D_RG5 having the change amount range of "63 to 32", zero channel may be included in the sixth data change amount range D_RG6 having the change amount range of "31 to 16", and zero channel may be included in the seventh data change amount range D_RG7 having the change amount range of "15 to 8".

Meanwhile, as described above, the channel, which has a range having a relatively small value including 0, e.g., the amount of change in data between 0 and 7 among the plurality of channels CH1 to CH30, may not be counted.

In addition, the weight value calculation part 113 may calculate an individual weight sum value (indicated by "SUM" in FIG. 7B) by multiplying the number of channels included in each of the plurality of data change amount ranges D_RG1 to D_RG7 by the weight value WT of the corresponding data change amount range on the basis of the counting data CT created by the counter part 112. For example, the weight value calculation part 113 may calculate the first individual weight sum value as 150 by multiplying 10, which is the number of channels included in the first data change amount range D_RG1, by 15 that is the first weight value WT1, and calculate the second individual weight sum value as 33 by multiplying 3, which is the number of channels included in the second data change amount range D_RG2, by 11 that is the second weight value WT2. With substantially the same or similar method, the weight value calculation part 113 may also calculate the third to seventh individual weight sum values as 8, 5, 15, 0, and 0 related to the third to seventh data change amount ranges D_RG3 to D_RG7.

In addition, the weight value calculation part 113 may calculate an average value of the plurality of individual weight sum values respectively corresponding to the plurality of data change amount ranges D_RG1 to D_RG7, e.g., an average value of 150, 33, 8, 5, 15, 0, and 0, as illustrated in FIG. 7B, as the average weight value AWT. For example, the weight value calculation part 113 may calculate a value made by dividing a sum value of 150, 33, 8, 5, 15, 0, and 0 by the total number of channels as the average weight value AWT. In the embodiment, in this case, as described above, because the channel, which has the range having a relatively small value including 0, e.g., the amount of change in data between 0 and 7, is not counted, the average weight value AWT may be calculated for twenty channels calculated by subtracting 10, which is the number of channels having the amount of change in data between 0 and 7, from 30 that is the total number of channels. That is, the weight value calculation part 113 may calculate 10.55 (about 11), which is a value made by dividing a sum value of 150, 33, 8, 5, 15, 0, and 0 by 20 as the average weight value AWT.

Next, with reference further to FIG. 7C, the power control signal generation part 114 may generate the power control signal PWRC corresponding to the corresponding average weight value AWT on the basis of the average weight value AWT created by the weight value calculation part 113. For example, as described above, in case that the average weight value AWT has a value of 10.55, the corresponding average weight value AWT is included in the second weight value range W_RG2. Therefore, the power control signal generation part 114 may generate the power control signal PWRC having the value of "HHL". Therefore, in response to the power control signal PWRC having the value of "HHL", the power controller 135 may generate the bias current IB having a value of 10 μA and provide the bias current IB to the plurality of output buffers 1341 to 134*p* of the buffer part 134, as illustrated in FIG. 7C.

As described above, the display device 100 according to the embodiment of the present specification may compare the image data DATA in the units of the horizontal lines LN1 to LNq for each of the plurality of channels CH1 to CHp included in the data driver 130, e.g., the source driving integrated circuit SDIC, classify the amounts of change in image data DATA in the horizontal line unit for each of the channels in accordance with the preset range, calculate the average weight value AWT by applying (multiplying) the number of channels included in each of the ranges by the weight value corresponding to the corresponding range, and then generate the power control signal PWRC corresponding to the average weight value AWT.

As described above, the display device 100 according to the embodiment of the present specification controls the drive currents of the plurality of output buffers 1341 to 134*p* included in the source driving integrated circuit SDIC by applying the weight value, which corresponds to the magnitude of the amount of change, not only to the amount of change in image data DATA for a particular channel but also to the amount of change in image data DATA for all the channels, such that the power consumption may be more effectively reduced.

The exemplary embodiments of the present disclosure can also be described as follows:

According to an aspect of the present disclosure, there is provided a display device. The display device includes a timing controller configured to generate image data and a data control signal on the basis of an input image and a control signal, a data driver configured to generate a plurality of data signals corresponding to the image data on the basis of the image data and the data control signal and output the plurality of data signals through a plurality of output buffers respectively corresponding to a plurality of channels and a display panel comprising a plurality of data lines connected to the plurality of output buffers, and a plurality of pixels connected to the plurality of data lines, wherein the timing controller compares the image data in a horizontal line unit for each of the plurality of channels and controls drive currents of the plurality of output buffers on the basis of the amounts of change in image data compared in the horizontal line unit for each of the channels.

The timing controller may classify the amounts of change in image data in accordance with a preset range, may calculate an average weight value by applying a weight value, which corresponds to a corresponding range, to the number of channels included in each range, and may control the drive currents of the plurality of output buffers on the basis of the average weight value.

The timing controller may control so that the drive currents of the plurality of output buffers increase as the average weight value increases.

The timing controller may calculate a difference in absolute value between image data corresponding to a first horizontal line and image data corresponding to a second horizontal line adjacent to the first horizontal line for each of the plurality of channels as the amount of change in image data.

The timing controller may classify the amounts of change in image data of each of the channels by counting the number of channels having the amount of change in image data included in each of a plurality of preset data change amount ranges.

The timing controller may calculate a plurality of individual weight sum values respectively corresponding to the plurality of data change amount ranges by multiplying the number of channels included in each of the plurality of data change amount ranges by a weight value corresponding to the corresponding data change amount range and calculates a value, which is made by dividing the plurality of individual weight sum values by the total number of channels included in the plurality of data change amount ranges as the average weight value.

The timing controller may generate a power control signal corresponding to the average weight value on the basis of a lookup table including values of the power control signal respectively corresponding to a plurality of weight value ranges, and the data driver may control the amount of electric current of a bias current provided to the plurality of output buffers on the basis of the power control signal.

The timing controller may include a data comparison part configured to create change amount data by calculating the amount of change in image data of two adjacent horizontal lines for each of the plurality of channels on the basis of the image data, a counter part configured to create counting data by counting the number of channels having the amount of change in image data respectively corresponding to a plurality of data change amount ranges included in a first lookup table on the basis of the change amount data and the first lookup table, a weight value calculation part configured to calculate the average weight value by applying a weight value corresponding to a corresponding data change amount range to the number of channels included in each of the plurality of data change amount ranges on the basis of the counting data and the first lookup table and a power control signal generation part configured to generate a power control signal corresponding to the average weight value on the basis of the average weight value and a second lookup table.

The first lookup table may include a plurality of data change amount ranges, and a plurality of weight values respectively corresponding to the plurality of data change amount ranges.

The plurality of weight values may have small values as the plurality of data change amount ranges decrease.

The plurality of data change amount ranges may not include at least some range among the entire ranges of the amount of change in image data.

The second lookup table may comprise a plurality of weight value ranges, and values of the power control signal respectively corresponding to the plurality of weight value ranges.

The value of the power control signal may have a small value as the plurality of weight value ranges decrease.

The amount of electric current of the drive currents of the plurality of output buffers may have a small value as the value of the power control signal decreases.

The data driver may include a register part configured to sequentially output a plurality of latch clock signals by being synchronized with a data clock signal included in the data control signal, a latch part configured to sample the image data by being synchronized with the plurality of latch clock signals on the basis of a line latch signal included in the data control signal, a digital-analog conversion part configured to convert the image data in a digital format into the plurality of data signals in an analog format and a buffer part comprising the plurality of output buffers configured to output the plurality of data signals.

The data driver may further comprise a power controller configured to control the amount of electric current of a bias current applied to the plurality of output buffers on the basis of the power control signal.

The amount of electric current of the bias current may have a small value as a value of the power control signal decreases.

According to another of the present disclosure, a display device includes a timing controller configured to create image data, a data driver configured to generate a plurality of data signals corresponding to the image data on the basis of the image data and output the plurality of data signals to a plurality of data lines respectively corresponding to a plurality of channels and a display panel comprising a plurality of pixels connected to the plurality of data lines, wherein the timing controller comprises a data comparison part configured to create change amount data by calculating the amount of change in image data of a first horizontal line and a second horizontal line adjacent to the first horizontal line for each of the plurality of channels on the basis of the image data, a counter part configured to create counting data by counting the number of channels having the amount of change in image data respectively corresponding to a plurality of data change amount ranges on the basis of the change amount data, a weight value calculation part configured to calculate a plurality of individual weight sum values by multiplying the number of channels included in each of the plurality of data change amount ranges by a weight value corresponding to a corresponding data change amount range on the basis of the counting data and calculate a value, which is made by dividing the plurality of individual weight sum values by the total number of channels included in the plurality of data change amount ranges as an average weight value and a power control signal generation part configured to generate a power control signal corresponding to the average weight value.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. All the technical concepts in the equivalent scope of the present disclosure should be construed as falling within the scope of the present disclosure.

What is claimed is:

1. A display device, comprising:

a timing controller configured to generate image data and a data control signal based on an input image and a control signal;

a data driver including a plurality of output buffers and a plurality of channels that are respectively connected to the plurality of output buffers, the data driver configured to generate a plurality of data signals based on the image data and the data control signal and output the plurality of data signals through the plurality of output buffers; and a display panel comprising a plurality of data lines connected to the plurality of output buffers and a plurality of pixels connected to the plurality of data lines, wherein the timing controller compares the image data in horizontal line units of pixels from the plurality of pixels for each of the plurality of channels and controls a magnitude of a drive current of the plurality of output buffers based on an amount of change in the image data compared in the horizontal line units for each of the plurality of channels, and wherein the timing controller is further configured to:

classify, for each of the plurality of channels, the amount of change in the image data to a preset range of data change from a plurality of preset ranges of data change;

count, for each of the plurality of preset ranges of data change, a total number of channels from the plurality of channels that are classified to the preset range of data change;

calculate, for each of the plurality of preset ranges of data change, a weight sum value by applying a weight value that corresponds to the preset range of data change to the total number of channels that are classified to the preset range of data change;

calculate an average weight value based on the weight sum value for each of the plurality of preset ranges of data change; and control the drive current of the plurality of output buffers based on the average weight value.

2. The display device of claim 1, wherein the timing controller is further configured to increase the magnitude of the drive current as the average weight value increases.

3. The display device of claim 1, wherein the timing controller is further configured to compare the image data in the horizontal line units of pixels by calculating a difference in absolute value between first image data corresponding to a first horizontal line and second image data corresponding to a second horizontal line that is adjacent to the first horizontal line for each of the plurality of channels to determine the amount of change in the image data.

4. The display device of claim 1, wherein the timing controller is further configured to generate the weight sum value for each of the plurality of preset ranges of data change by multiplying the total number of channels that are classified to the preset range of data change by the weight value corresponding to the preset range of data change, and the timing controller is configured to calculate the average weight value by dividing a sum of the weight sum values by the total number of channels.

5. The display device of claim 4, wherein the timing controller is further configured to generate a power control signal having a value that corresponds to the average weight value where the value is determined based on a lookup table including different values for the power control signal that each correspond to a different weight value range, and the data driver controls the magnitude of the drive current based on the value of the power control signal.

6. The display device of claim 1, wherein the timing controller comprises:

a data comparison part configured to create change amount data by calculating the amount of change in the image data of two adjacent horizontal lines for each of the plurality of channels based on the image data;

a counter part configured to count the total number of channels that are classified in each of the plurality of preset ranges, the plurality of preset ranges and the weight value for each of the plurality of preset ranges included in a first lookup table;

a weight value calculation part configured to apply, for each of the plurality of preset ranges, the weight value that corresponds to the preset range to the total number of channels that are classified to the preset range and calculate the average weight value using the first lookup table; and a power control signal generation part configured to generate a power control signal based on the average weight value and a second lookup table.

7. The display device of claim 6, wherein the first lookup table includes the plurality of preset ranges of data change and a plurality of weight values, each weight value corresponding to one of the plurality of preset ranges of data change.

8. The display device of claim 7, wherein the plurality of weight values decrease as an amount of data change in the plurality of preset ranges decreases.

9. The display device of claim 7, wherein the plurality of preset ranges of data change collectively include a portion of all possible ranges of the amount of change in the image data without covering an entirety of all the possible ranges.

10. The display device of claim 6, wherein the second lookup table comprises a plurality of weight value ranges and a plurality of values of the power control signal that each correspond to one of the plurality of weight value ranges, and a value of the power control signal is selected from the plurality of values of the power control signal based on one of the plurality of weight value ranges that correspond to the average weight value.

11. The display device of claim 10, wherein the plurality of values of the power control signal decrease as the plurality of weight value ranges decrease.

12. The display device of claim 11, wherein the magnitude of the drive current decreases as the value of the power control signal decreases.

13. The display device of claim 6, wherein the data driver comprises:

a register part configured to sequentially output a plurality of latch clock signals that are synchronized with a data clock signal included in the data control signal;

a latch part configured to sample the image data by being synchronized with the plurality of latch clock signals based on a line latch signal included in the data control signal;

a digital-analog conversion part configured to convert the image data that are in a digital format into the plurality of data signals that are in an analog format; and a buffer part comprising the plurality of output buffers configured to output the plurality of data signals.

14. The display device of claim 13, wherein the data driver further comprises a power controller configured to control the magnitude of the drive current applied to the plurality of output buffers based on the power control signal.

15. A display device, comprising:

a display panel comprising a plurality of data lines, a plurality of gate lines, and a plurality of pixels connected to the plurality of data lines and the plurality of gate lines;

a data driver including a plurality of output buffers and a plurality of channels that are each connected to a corresponding one of the plurality of output buffers and a corresponding one of the plurality of data lines, the data driver configured to generate a plurality of data signals corresponding to first image data of a first line of pixels from the plurality of pixels and output the plurality of data signals to the plurality of channels through the plurality of output buffers; and a timing controller configured to output a power control signal to the data driver, the power control signal having a value that is based on a difference between the first image data of the first line of pixels and second image data of a second line of pixels from the plurality of pixels, wherein the data driver is configured to select a magnitude of a drive current from a plurality of different magnitudes based on the value of the power control signal and apply the drive current having the selected magnitude to the plurality of output buffers, the applied drive current amplifying the plurality of data signals corresponding to the first image data, and wherein the timing controller is further configured to:

classify, for each of the plurality of channels, the value to a preset range of data change from a plurality of preset ranges of data change;

count, for each of the plurality of preset ranges of data change, a total number of channels from the plurality of channels that are classified to the preset range of data change;

calculate, for each of the plurality of preset ranges of data change, a weight sum value by applying a weight value that corresponds to the preset range of data change to the total number of channels that are classified to the preset range of data change;

calculate an average weight value based on the weight sum value for each of the plurality of preset ranges of data change; and control the drive current of the plurality of output buffers based on the average weight value.

16. The display device of claim 15, wherein the timing controller comprises:

a data comparison part configured to create, for each of the plurality of channels, change amount data by calculating an amount of change in the first image data and the second image data;

a counter part configured to classify the change amount data for each of the plurality of channels to a preset range of data change from a plurality of preset ranges of data change, and count a total number of channels that are classified in each of the plurality of preset ranges;

a weight value calculation part configured to calculate, for each of the plurality of preset ranges of data change, a weight sum value by applying a weight value that corresponds to the preset range of data change to the total number of channels that are classified to the preset range of data change, and calculate an average weight value based on the weight sum value for each of the plurality of preset ranges of data change; and a power control signal generation part configured to generate the power control signal based on the average weight value.

17. The display device of claim 16, wherein the timing controller is further configured to increase the drive current of the plurality of output buffers as the average weight value increases.

18. The display device of claim 16, wherein the timing controller further comprises:

a memory storing a first lookup table and a second lookup table, wherein the first lookup table includes the plurality of preset ranges of data change and a plurality of weight values, each weight value corresponding to one of the plurality of preset ranges, wherein the second lookup table includes a plurality of weight value ranges, a plurality of values of the power control signal that each correspond to one of the plurality of weight value ranges, and the plurality of different magnitudes of the drive current that each correspond to one of the plurality of weight value ranges and one of the plurality of values.

19. The display device of claim 18, wherein the power control signal generation part is configured to generate the power control signal by mapping the average weight value to a weight value range from the plurality of weight value ranges that includes the average weight value and determine a value from the plurality of values of the power control signal that corresponds to the weight value range, wherein the selected magnitude of the drive current corresponds to the determined value of the power control signal.

* * * * *